US012628840B2

(12) United States Patent
Gonzalez Pizarro et al.

(10) Patent No.: US 12,628,840 B2
(45) Date of Patent: May 19, 2026

(54) **GROUP OF MICROORGANISMS COMPOSED BY *LACTOBACILLUS* SP STRAIN K03D08, *BACILLUS* SP STRAIN K03B01 AND *KAZACHSTANIA* SP STRAIN K03K02G AND ITS COMPOSITIONS; A PROCESS FOR OBTAINING CASEIN-FREE DAIRY DERIVATIVE CONTAINING SHORT-CHAIN FATTY ACIDS AND HYDROXYLATED SHORT-CHAIN FATTY ACIDS GENERATED BY THE METABOLISM OF THE GROUP OF MICROORGANISMS**

(71) Applicants: UNIVERSIDAD DE VALPARAISO, Valparaiso (CL); Karoll Andriettee Gonzalez Pizarro, Las Ventanas Puchuncavi (CL)

(72) Inventors: Karoll Andriettee Gonzalez Pizarro, Las Ventanas (CL); Miguel Alejandro Dinamarca Tapia, Valparaiso (CL); Claudia Jimena Ibacache Quiroga, Valparaiso (CL)

(73) Assignees: UNIVERSIDAD DE VALPARAISO, Valparaiso (CL); KAROLL ANDRIETTEE GONZALEZ PIZARRO, Las Ventanas (CL)

( * ) Notice: Subject to any disclaimer, the term of this patent is extended or adjusted under 35 U.S.C. 154(b) by 614 days.

(21) Appl. No.: 17/904,958

(22) PCT Filed: Feb. 25, 2020

(86) PCT No.: PCT/IB2020/051608
§ 371 (c)(1),
(2) Date: Aug. 25, 2022

(87) PCT Pub. No.: WO2021/171061
PCT Pub. Date: Sep. 2, 2021

(65) Prior Publication Data
US 2023/0138227 A1 May 4, 2023

(51) Int. Cl.
*A23C 9/127* (2006.01)

(52) U.S. Cl.
CPC .................................... *A23C 9/127* (2013.01)

(58) Field of Classification Search
CPC ...................................................... A23C 9/127
(Continued)

(56) References Cited

U.S. PATENT DOCUMENTS

2011/0123640 A1    5/2011   Yabumoto et al.
2017/0196922 A1 *  7/2017   Embree ................ A61K 36/064
2022/0256877 A1 *  8/2022   Myers ................... A23L 29/065

FOREIGN PATENT DOCUMENTS

CN     103300147 A      9/2013
CN     107691643      *  2/2018  ........... A23C 9/1307
(Continued)

OTHER PUBLICATIONS

International Search Report for Corresponding International Application No. PCT/IB2020/051608, Oct. 9, 2020, 3 pages.

*Primary Examiner* — Nikki H. Dees
*Assistant Examiner* — Philip A Dubois
(74) *Attorney, Agent, or Firm* — LUCAS & MERCANTI, LLP

(57) ABSTRACT

A group of microorganisms, composed of *Lactobacillus* sp. strain K03D08, *Bacillus* sp. strain K03B01 and *Kazachstania* sp. strain K03K02G, which allows the hydrolysis of casein in different dairy products and the production of short-chain fatty acids and hydroxylated short-chain fatty acids; a process for obtaining a casein-free dairy derivative and enriched in short-chain fatty acids and hydroxylated short-chain fatty acids using the aforementioned microorganisms; compositions containing the microorganisms; and the production method of each of the microorganisms.

1 Claim, 2 Drawing Sheets

A

B

(58) Field of Classification Search
USPC ........................................................ 426/43
See application file for complete search history.

(56) References Cited

FOREIGN PATENT DOCUMENTS

| CN | 107691643 A | * | 2/2018 | ........... A23C 9/1307 |
| WO | 2017005601 A1 | | 1/2017 | |

* cited by examiner

GROUP OF MICROORGANISMS COMPOSED BY *LACTOBACILLUS* SP STRAIN K03D08, *BACILLUS* SP STRAIN K03B01 AND *KAZACHSTANIA* SP STRAIN K03K02G AND ITS COMPOSITIONS; A PROCESS FOR OBTAINING CASEIN-FREE DAIRY DERIVATIVE CONTAINING SHORT-CHAIN FATTY ACIDS AND HYDROXYLATED SHORT-CHAIN FATTY ACIDS GENERATED BY THE METABOLISM OF THE GROUP OF MICROORGANISMS

CROSS REFERENCE TO RELATED APPLICATION

This Application is a 371 of PCT/IB2020/051608 filed on Feb. 25, 2020, the contents is incorporated herein by reference.

The present invention corresponds to a group of microorganisms that allow the hydrolysis of casein in different dairy products, compositions containing the microorganisms, production method of each of the microorganisms of the invention and a process for obtaining a casein-free dairy derivative containing short-chain fatty acids and hydroxylated short-chain fatty acids.

BACKGROUND AND PRIOR ART

Dairy derivatives with reduced casein content are products that have increased their consumption because many of them have been reported as less allergenic compared to other types of products, making them potentially useful for example for newborn food formulas. Casein hydrolysates can be traditionally produced using proteolytic enzymes, which are responsible for hydrolyzing casein (the main milk protein). However, using enzymes in different production processes makes them more expensive since the enzymes themselves are the more expensive inputs in various production processes. Additionally, the products that have a low casein content can be produced through thermal treatments or acid or alkaline hydrolysis, which can produce severe degradation in several of the amino acids present in milk, reducing its nutritional value. This loss in its nutritional value generates additional costs in the production process since the resulting dairy product must be supplemented with all the nutrients that were lost during the casein hydrolysis stage. Furthermore, current production processes are carried out between 45° C. and 60° C., generating extra costs to be able to maintain said temperature range during the production time period (between 36 to 56 hours).

Different attempts have been made in search of finding solutions to reduce costs associated with this production process, within which the use of microorganisms has taken a relevant importance.

Microorganisms stand out for being life forms that have a wide metabolic diversity, which, for example, translates into the presence of extracellular hydrolytic enzymes (secreted or membrane-anchored), capable of degrading the different substrates available in their environment so that they can be metabolized as monomeric units. Among the enzymes of interest are the proteases since these have been used in different industrial applications.

Specifically, regarding the degradation of milk proteins, publications of patent documents have been described that seek, in most cases, to degrade casein by enzymatic methods, for example document US2017037442A1 describes a casein hydrolysate through the controlled hydrolysis of a substrate rich in this protein, using a proteolytic preparation derived from a fungus of the genus *Aspergillus*. It is described that the produced hydrolysate has at least a 98% reduction in terms of its antigenicity and regarding the sizes of the peptides generated, it is indicated that these, in general, are greater than 5 kDa. It is indicated that the casein-rich raw material may be cow's milk. The document WO2016066758A1 describes hydrolysates and their use in the treatment and/or prevention of diarrhea, since these hydrolysates inhibit the enzyme neprilysin which is associated with this pathology. The method for obtaining these hydrolysates involves the incubation of the milk to be treated with preparations of proteases selected from the group of neutral proteases, alkaline proteases, thermolysins and mixtures thereof. The document US2011097760A1 describes a method of producing a casein hydrolysate using an endopeptidase. This document explicitly describes what the amino acid composition of said enzyme would be. The document U.S. Pat. No. 5,486,461A describes an enzymatic method for obtaining casein hydrolysates that uses three different proteolytic enzymes. It is further noted that this method allows to obtain a preparation that completely hydrolyzes casein. However, due to the associated costs involved in the use of pure enzyme preparations, the disclosure of documents describing the degradation of casein by means of the use of microorganisms has been increasing.

The document US2009214498A1 generally describes a method of producing antimicrobial peptides by incubating a biologically pure culture of *Lactobacillus acidophilus*, strain DPC6026, using milk or a product derived from milk as raw material.

The degradation of casein mediated by microorganisms has been described mainly in the bacterial genus *Lactobacillus*, genus known to be frequently found in dairy products. Among the species of this genus that are known for their ability to degrade casein in dairy products, is the bacterium *Lactobacillus lactis*.

However, the state of the art does not teach any microbial group such as the one described in the present invention. Specifically, no document described in the state of the art discloses a group of microorganisms associated with this particular use, composed of *Lactobacillus* sp. strain K03D08, *Bacillus* sp. strain K03B01 and *Kazachstania* sp. strain K03K02G, which allows obtaining a dairy derivative with a casein content of less than 0.5% w/v. Additionally, the process described in the present application works optimally at significantly lower temperatures (26° C.-37° C.) compared to the current process (45° C.-60° C.), therefore significant savings are also expected due to this temperature differential.

Thus, the high cost in terms of the use of enzymatic preparations to obtain dairy products with a low casein content remains as a problem in the state of the art; further, the currently available microorganisms cannot act efficiently to perform this process.

DETAILED DESCRIPTION OF THE INVENTION

Figure 1:
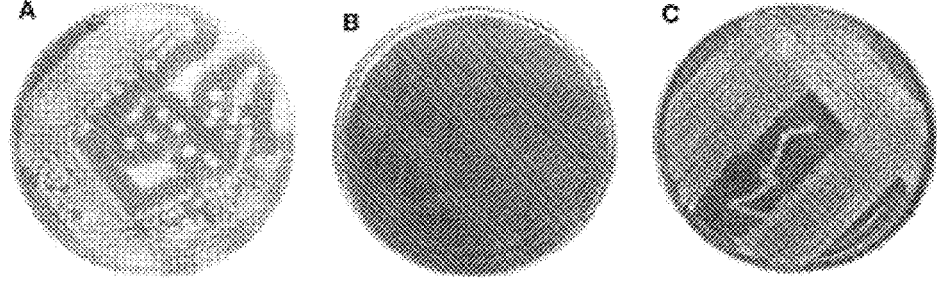
FIG. 1. Microbial growth in solid culture medium. A: *Bacillus* sp. strain K03B01 growth on skim milk agar. B: *Lactobacillus* sp. Strain K03D08 growth on agar MRS. C: *Kazachstania* sp. strain K03K02G growth on agar Sabouraud.

The present invention corresponds to a group of microorganisms that allow the hydrolysis of casein in different dairy products and the production of short-chain fatty acids and hydroxylated short-chain fatty acids; a process of obtaining a casein-free dairy derivative and enriched in short-chain fatty acids and hydroxylated short-chain fatty acids using the aforementioned microorganisms; compositions containing the microorganisms; and finally to the production method of each of the microorganisms of the invention.

The present invention corresponds to a group of three microorganisms that allow the degradation of casein present in dairy products and the production of short-chain fatty acids and hydroxylated short-chain fatty acids. In a specific embodiment, the process comprises at least one *Bacillus* sp. isolated strain, at least one *Lactobacillus* sp. isolated strain, and at least one *Kazachstania* sp. isolated strain.

The strains were identified using conserved markers. In the case of the fungal strain, ITS4-ITS5 was used, whereas in the case of bacteria, 16S rDNA sequences were used.

All the strains described in the present invention, i.e. the *Bacillus* sp. K03B01 strain, *Lactobacillus* sp. K03D08 strain and *Kazachstania* sp. K03K02G strain, have been deposited in the Chilean Collection of Microbial Genetic Resources (CChRGM), at Avenida Vicente Méndez 515, Chillán, Región de Ñuble, Chile, in accordance with the Budapest Treaty. Access numbers for each strain are specified below.

| Microorganism | Access No. | Deposit date |
|---|---|---|
| *Lactobacillus* sp. strain K03D08 | RGM2950 | Jan. 30, 2020 |
| *Bacillus* sp. strain K03B01 | RGM2934 | Jan. 22, 2020 |
| *Kazachstania* sp. strain K03K02G | RGM2935 | Jan. 22, 2020 |

In a second aspect of the invention, the composition containing the group of microorganisms of the present invention is a wettable powder composition, a concentrated suspension, liquid or paste or gel, or other systems such as encapsulation of microorganisms, such as microcapsules, nanoparticles formed by inorganic materials, such as silicon dioxide, silver or others, or organic materials, such as suitable gelling agents, such as in biodegradable polymer matrices such as agar agar, carrageenan, gelatin, among others, and excipients acceptable in the food industry.

The wettable powder and/or liquid composition of the present invention comprises at least one isolated strain selected from an isolated strain of the genus *Bacillus*, a *Lactobacillus* isolated strain and at least a *Kazachstania* isolated strain in a (2:1:1) ratio.

The excipients for the case of a wettable powder composition are selected from: cereal starches, lactose, talc, maltodextrin, diatomaceous earth, or a microbiologically acceptable carrier.

In the composition of the present invention, the isolated strains of *Lactobacillus* sp. K03D08 and *Kazachstania* sp. K03K02G, are present in a ratio that can be 1:1, 1:2, 2:1, 1:3, 3:1, 2:3, 3:2, 1:4, 4:1, 3:4, 4:3, 1:5, 5:1, 1:6, 6:1, 1:7, 7:1, 1:8, 8:1, 1:9, 9:1, 1:10; 10:1, 5:6, 6:5, 6:7, 7:6, 7:8, 8:7, 8:9, 9:8, with an ideal ratio of 1:1 For the formulation, the microorganisms come from pure cultures and grown in ideal liquid culture media for each of the strains indicated in this invention.

The final number of microorganisms in the composition of the present invention is: the isolated strain of *Lactobacillus* sp. K03D08 present between $10^1$ and $10^{15}$ CFU/ml or CFU/g, the isolated strain of *Kazachstania* sp. K03K02G is present between $10^1$ and $10^{15}$ CFU/ml or CFU/g, and the isolated strain of *Bacillus* sp. K03B01 is present between $10^1$ and $10^{15}$ CFU/ml or CFU/g.

Furthermore, the present invention discloses a procedure for obtaining each of the microorganisms, and this procedure involves the following steps:

1) Cultivating the *Lactobacillus* sp. K03D08 strain for 12-96 h, with an agitation of 5-300 rpm and 20-37° C., in Man, Rogosa and Sharpe medium (MRS: 1% w/v peptone, 0.8% w/v meat extract, 0.4% w/v yeast extract, 2% w/v glucose, 0.2% w/v dipotassium hydrogenated phosphate, 0.5% w/v sodium acetate trihydrate, 0.2% w/v triammonium citrate, 0.02% w/v magnesium sulphate heptahydrate, 0,005% w/v manganese sulphate tetrahydrate, 0.1% w/v tween 80, final pH 6.2-6.5).

2) Cultivating the *Bacillus* sp. K03B01 strain in skim milk medium (0.25% w/v yeast extract, 0.1% w/v glucose, 0.1% w/v skim milk, final pH 6.0-7.0), for 12-96 h, at 5-300 rpm and 20-37° C.

3) Cultivating the *Kazachstania* sp. K03K02G strain in skim milk medium (0.25% w/v yeast extract, 0.1% w/v glucose, 0.1% skim milk, final pH 6.0-7.0), for 12-96 h, at 5-300 rpm and 20-37° C.

4) Centrifuge each culture of microorganisms between 1.000 and 4.000 rpm for 5-30 min at 4-25° C.

5) Discard the supernatant and suspend the microbial cells in the same volume of physiological serum (NaCl 0.9% w/v).

6) Quantify the optical density of the suspensions obtained in point 5) at a wavelength of 595-600 nm (O.D: 600 nm).

The present invention further discloses a process for the production of a dairy derivative with a low casein content that comprises the following steps:

a) Incubating the *Bacillus* sp. K03B01 strain in milk of bovine origin between 6 and 120 hours and at a temperature between 20° C. and 37° C., in a proportion between 0.1-10% w/v or 0.1-10% w/w, with agitation between 5-300 rpm.

b) Preparing a composition comprising the microorganisms *Lactobacillus* sp. K03D08 and *Kazachstania* sp. K03K02G in a (1:1) ratio.

c) Adding the composition obtained in point b) to the solution obtained in point a) and incubating for between 12 and 120 hours and at a temperature of 20-37° C., with aeration through stirring between 0-50 rpm.

d) Centrifugating the solution obtained in point c), between 4.000 and 10.000 rpm and recovering the supernatant.

e) Filtering the supernatant through a membrane of 1-1000 μm pore diameter.

f) Filtering the supernatant through a 0.2-0.45 μm pore diameter membrane.

g) Recovering the filtrate h) Lyophilizing the filtrate obtained in point f) until total dehydration at −80° C. and between 666.6 Pa to 1999.8 Pa (5-15 mTorr).

In a more specific embodiment, the incubation period of milk of bovine origin with *Bacillus* sp. K03B01 is between 12 and 96 hours.

In a more specific preferred embodiment, the incubation temperature of *Bacillus* sp. K03B01 with milk of bovine origin is between 26° C. and 37° C.

In the context of the present invention, it is understood as part of the knowledge of an expert the preparation and cultivation methods of the isolated strains. Representative methods are shown in the examples that follow hereinafter and are intended to illustrate the present invention, but not to limit its scope.

EXAMPLES

Example 1: Obtaining and Selection of Microorganisms Capable of Reducing Casein and Lactose Present in Dairy Products The strains presented in the present invention were obtained from fermented dairy products of the probiotic type and belonging to the Center for Micro-Bioinnovation (University of Valparaiso, Valparaiso, Chile). These fermented products were previously characterized through microbiological and metagenomics studies, identifying genes and enzymes related to casein and lactose hydrolysis, in addition to the production of short-chain fatty acids. In this sense, it was considered that the fermented products are natural sources of microorganisms, genes, enzymes and biomolecules of applied interest, and therefore the source or origin of the strains of the present invention.

With the aim of isolating the microorganisms present in these dairy fermentations, serial dilutions were performed in physiological serum and seeded on skim milk agar supplemented with yeast extract and casamino acids. From these microbial cultures, the isolation and selection of colonies grown at a temperature of 30° C. was performed. With the colonies we proceeded to generate a bank of microorganisms. To determine the properties and activities of interest, each of the isolated strains was grown in the following selective culture media (Table 1).

TABLE 1

Culture media used and relevant phenotypes

| Culture medium | Relevant phenotype |
| --- | --- |
| Skim milk agar | Determination of hydrolysis of casein |
| MRS agar | Identification of bacteria that produce lactic acid |
| GYC agar | Identification of acetic acid-producing microorganisms |
| Sabouraud agar | Yeast isolation |

Figure 2:
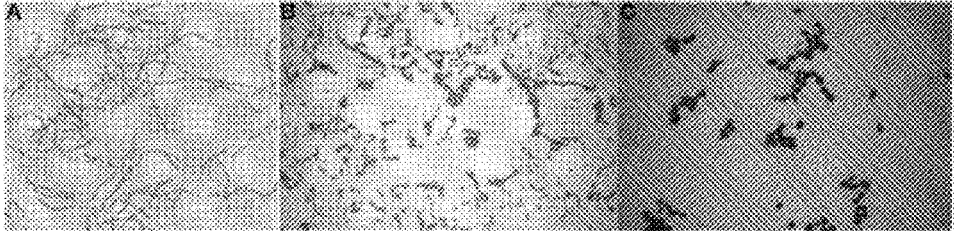
FIG. 2. Gram stain of selected microbial strains. A: *Bacillus* sp. strain K03B01. B: *Lactobacillus* sp. strain K03D08. C: *Kazachstania* sp. strain K03K02G.
Figure 3:
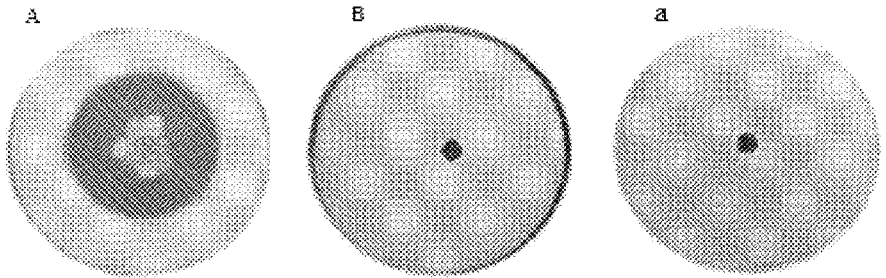
FIG. 3. Casein hydrolysis of selected strains. Evaluation of the hydrolysis of casein on skim milk agar *Bacillus* sp. strain K03B01 (A), *Lactobacillus* sp. strain K03D08 (B) and *Kazachstania* sp. strain K03K02G (C). Casein hydrolysis is visualized as a translucent halo around the inoculation well.
Figure 4:
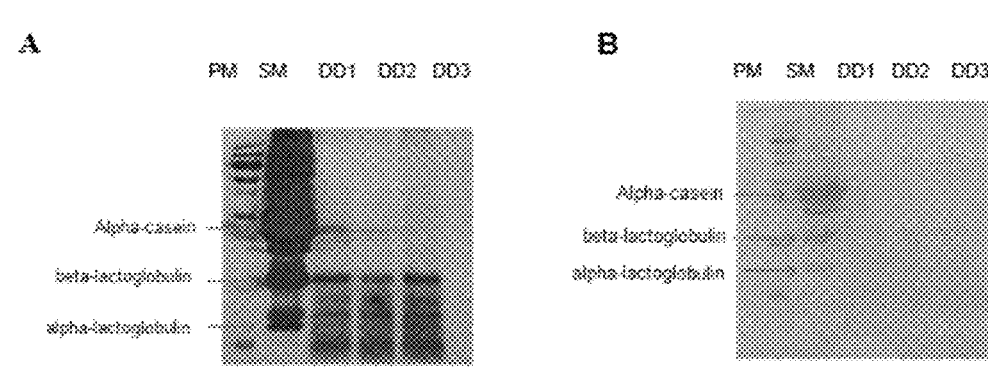
FIG. 4. Casein hydrolysis in casein-free dairy derivative. Acrylamide gel protein electrophoresis of proteins present in skim milk (SM) and in the samples of the dairy derivative of the present invention (DD), visualized with staining with silver salts (A) and Coomassie blue staining (B).

The isolated strains were microbiologically characterized (gram stain, morphology) (FIG. 2, Table 2), molecularly (Table 3) and biochemically (Table 4). Additionally, the ability of these microbial strains to hydrolyze casein present in milk was determined (Table 5). From this process, strains of different microorganisms with phenotypes of interest such as lactose metabolism, glucose fermentation and protein hydrolysis were selected.

TABLE 2

Characterization of the selected strains and relevant phenotypes

| Strain | Characteristics |
| --- | --- |
| K03B01 | Bacteria. Gram-positive *bacillus*. Casein hydrolysis. |
| K03D08 | Bacteria. Gram-positive *bacillus*. Beta-galactosidase activity, lactose metabolism. Lactic acid production. |
| K03K02G | Yeast. Acetic acid production |

TABLE 3

Molecular characterization of the selected strains, by means of amplification and sequencing of 16S rDNA for strains K03B01 and K03D08 while for strain K03K02G the ITS4-ITS5 region was used.

| Strain | Molecular identification | Homology |
| --- | --- | --- |
| K03B01 | *Bacillus* sp. | 100% *Bacillus aryabhattai* |
| K03D08 | *Lactobacillus* sp. | 100% *Lactobacillus plantarum* |
| K03K02G | *Kazachstania* sp. | 100% *Kazachstania unispora* |

TABLE 4

Enzymatic activity of the selected strains

| Proof | Reaction/ Enzymes | *Bacillus* sp. K03B01 | *Lactobacillus* sp K03D08 | *Kazachstania* sp. K03K02G |
| --- | --- | --- | --- | --- |
| ONPG | β-galacto-sidase | + | + | + |
| VP | Acetoin | + | + | + |
| GEL | Gelatinase | + | − | − |

TABLE 5

Casein hydrolysis in selected strains

| Strain | Hydrolysis halo in skim milk agar (mm) | Casein Quantification* |
| --- | --- | --- |
| *Bacillus* sp. K03B01 | 60 | <0.00025 g/100 ml |
| *Lactobacillus* sp. K03D08 | 15 | >2.5 g/100 ml |
| *Kazachstania* sp. K03K02G | 0 | >2.5 g/100 ml |

*Casein quantification in skim milk culture inoculated and incubated with the selected strains.

Example 2: Optimization of the Production Process of a Casein-Free Dairy Derivative Enriched in Short-Chain Fatty Acids and Hydroxylated Short-Chain Fatty Acids During this development, three production processes were evaluated to obtain a dairy product, casein-free, low in lactose and enriched in short-chain fatty acids and hydroxylated short-chain fatty acids. Under these conditions, the microorganisms to be used in the process and its physico-chemical conditions were evaluated.

TABLE 6

| | Condition 1 | Condition 2 | Condition 3 |
|---|---|---|---|
| | Production conditions evaluated for the dairy derivative | | |
| Microorganisms | *Bacillus* sp. strain K03B01 | *Bacillus* sp. strain K03B01:*Lactobacillus* sp. strain K03D08:*Kazachstania* sp. strain K03K02G (2:1:1). | *Bacillus* sp. strain K03B01 *Lactobacillus* sp. strain K03D08:*Kazachstania* sp. strain K03K02G (1:1). |
| Process type | 1 Step | 1 Step | 2 Steps |
| Process | Inoculate the microorganism in skim milk in a proportion of 2% w/v. Incubate at 37° C. for 48 h, with agitation. Centrifuge at 6000 RPM for 30 min at 4° C. Filter the supernatant through a membrane with a 0.22 μm pore diameter. | Inoculate the microbial composition in skim milk in a proportion of 2% w/v. Incubate at 37° C. for 48 h, without agitation. Centrifuge at 6000 RPM for 30 min at 4° C. Filter the supernatant through a membrane with a 0.22 μm pore diameter. | Step 1 Inoculate the *Bacillus* sp. K03B01 strain in skim milk in a proportion of 2% w/v. Incubate at 30° C. for 48 h, at 150 rpm. Step 2 Inoculate the resulting product of Step 1 with the microbial composition comprising the strains *Lactobacillus* sp. K03D08 and *Kazachstania* sp. K03K02G (1:1) in a proportion of 2% w/v. Incubate at 37° C., without agitation for 48 h. Centrifuge at 6000 RPM for 30 min at 4° C. Filter the supernatant through a membrane with a 0.22 μm pore diameter. |
| Product characteristics | Casein: <0.00025 g/100 ml Lactic acid: N.D. Acetic acid: N.D. Lactose: 4.2 g/100 ml | Casein: <0.00025 g/100 ml Lactic acid: N.D. Acetic acid: N.D. Lactose: 4.2 g/100 ml | Casein: <0.00025 mg/100 ml Lactic acid: 1.642 g/100 ml Acetic acid: 0.402 g/100 ml Lactose: <3 g/100 ml |

N.D.: Not detected

Based on the conditions evaluated, the Condition 3 was selected as a production process of a casein-free dairy derivative that contains short-chain fatty acids and hydroxylated short-chain fatty acids.

Example 3: Comparative Example Between Formulations with Different Compositions of Microorganisms Given that the individual analysis of the strains allowed to establish that the microorganism *Bacillus* sp. K03B01 strain had the highest casein hydrolysis capacity, this microorganism was selected for the process, while the microorganisms *Lactobacillus* sp. strain K03D08 and *Kazachstania* sp. strain K03K02G were selected for their ability to metabolize lactose and glucose and produce short-chain fatty acids and hydroxylated short-chain fatty acids. The characterization of the products obtained in each of the combinations of microorganisms and the different production processes are detailed below.

TABLE 7

| | | Characterization of the dairy derivative generated through the different production processes | |
|---|---|---|---|
| Microorganisms | *Bacillus* sp. strain K03B01 | *Bacillus* sp. strain K03B01:*Lactobacillus*sp. strain K03D08:*Kazachstania* sp. strain K03K02G (2:1:1). | *Bacillus* sp. strain K03B01 *Lactobacillus* sp. strain K03D08:*Kazachstania* sp. strain K03K02G (1:1). |
| Process type | 1 Step | 1 Step | 2 Steps |
| Casein | <0.00025 g/100 ml | <0.00025 g/100 ml | <0.00025 g/100 ml |
| Acetic acid | ND | ND | 0.402 g/100 ml |
| Lactic acid | ND | ND | 1.642 g/100 ml |
| Lactose | 4.2 g/100 ml | 4.2 g/100 ml | <3 g/100 ml |

ND: Not detected

TABLE 8

| Characteristic | Skim milk (substrate) | Dairy derivative |
|---|---|---|
| | Characterization of the dairy derivative obtained in the present invention and of the skim milk used as a substrate for the production process | |
| Casein | >2.5 g/100 ml | < 0.00025 g/100 ml |
| Acetic acid | ND | 0.402 g/100 ml |
| Lactic acid | 0.08 g/100 ml | 1.642 g/100 ml |
| Lactose | 4.6 g/100 ml | <3 g/100 ml |

N.D.: Not detected

The invention claimed is:

1. A method of producing a dairy product with a casein content lower than 0.00025 g/100 mL and containing short-chain fatty acids and hydroxylated short-chain fatty acids comprising:
- i. incubating a *Bacillus* sp. K03B01 strain in milk of bovine origin between 6 and 120 hours and at a temperature between 20° C. and 37° C., in a proportion between 0.1-10% w/v or 0.1-10% w/w, with agitation between 5-300 rpm to obtain a first solution;
- ii. preparing a composition comprising microorganisms *Lactobacillus* sp. K03D08 and *Kazachstania* sp. K03K02G in a (1:1) ratio;
- iii. adding the prepared composition from ii) to the first solution obtained in i) and incubating for between 12 and 120 hours and at a temperature of 20° C. and 37° C., with aeration through stirring between 0-50 rpm to obtain a second solution;
- iv. centrifugating the second solution obtained in iii), between 4,000 and 10,000 rpm and recovering a supernatant;
- v. filtering the supernatant through a 0.2-0.45 μm pore diameter membrane;
- vi. recovering a filtrate; and
- vii. lyophilizing the filtrate obtained in vi) until total dehydration at −80° C. and between 666.6 Pa to 1999.8 Pa (5-15 mTorr).

* * * * *